United States Patent [19]

Song

[11] Patent Number: 5,760,842
[45] Date of Patent: Jun. 2, 1998

[54] METHOD OF SELECTING INPUT/OUTPUT SOURCE IN DOUBLE/WIDE TELEVISION SET AND APPARATUS THEREFOR

[75] Inventor: Kwon-eui Song, Suwon, Rep. of Korea

[73] Assignee: SamSung Electronics Co., Ltd., Kyungki-do, Rep. of Korea

[21] Appl. No.: 605,862

[22] Filed: Feb. 23, 1996

[30] Foreign Application Priority Data

May 30, 1995 [KR] Rep. of Korea ............... 1995-13970

[51] Int. Cl.$^6$ ............................................................... H04N 5/445
[52] U.S. Cl. ............................ 348/564; 348/706; 348/553; 348/588
[58] Field of Search .................................. 348/553, 563, 348/564, 565, 705, 706, 588, 734, 840, 556, 569

[56] References Cited

U.S. PATENT DOCUMENTS

| | | | |
|---|---|---|---|
| 4,862,292 | 8/1989 | Enari et al. | 386/92 |
| 5,204,662 | 4/1993 | Oda et al. | 348/706 |
| 5,237,418 | 8/1993 | Kaneko | 348/564 |
| 5,347,318 | 9/1994 | Kobayashi et al. | 348/564 |
| 5,450,140 | 9/1995 | Washino | 348/722 |
| 5,557,342 | 9/1996 | Eto et al. | 348/706 |
| 5,565,929 | 10/1996 | Tanaka | 348/565 |

*Primary Examiner*—Victor R. Kostak
*Attorney, Agent, or Firm*—Sughrue, Mion, Zinn, Macpeak & Seas, PLLC

[57] ABSTRACT

A double/wide television set incorporated with a double-deck VCR or a CD system is provided with a simplified method of selecting an input/output source. The method uses a matrix screen which is inserted into a basic screen of a master On-Screen Display generator. The user selects the input/output source from the matrix screen. Selection from the matrix is accomplished either by depressing numeral buttons of a selection key pad, such as on a remote control, or through a cursor that is displayed on the matrix screen and then moved about the matrix by the user using buttons of the keypad.

13 Claims, 3 Drawing Sheets

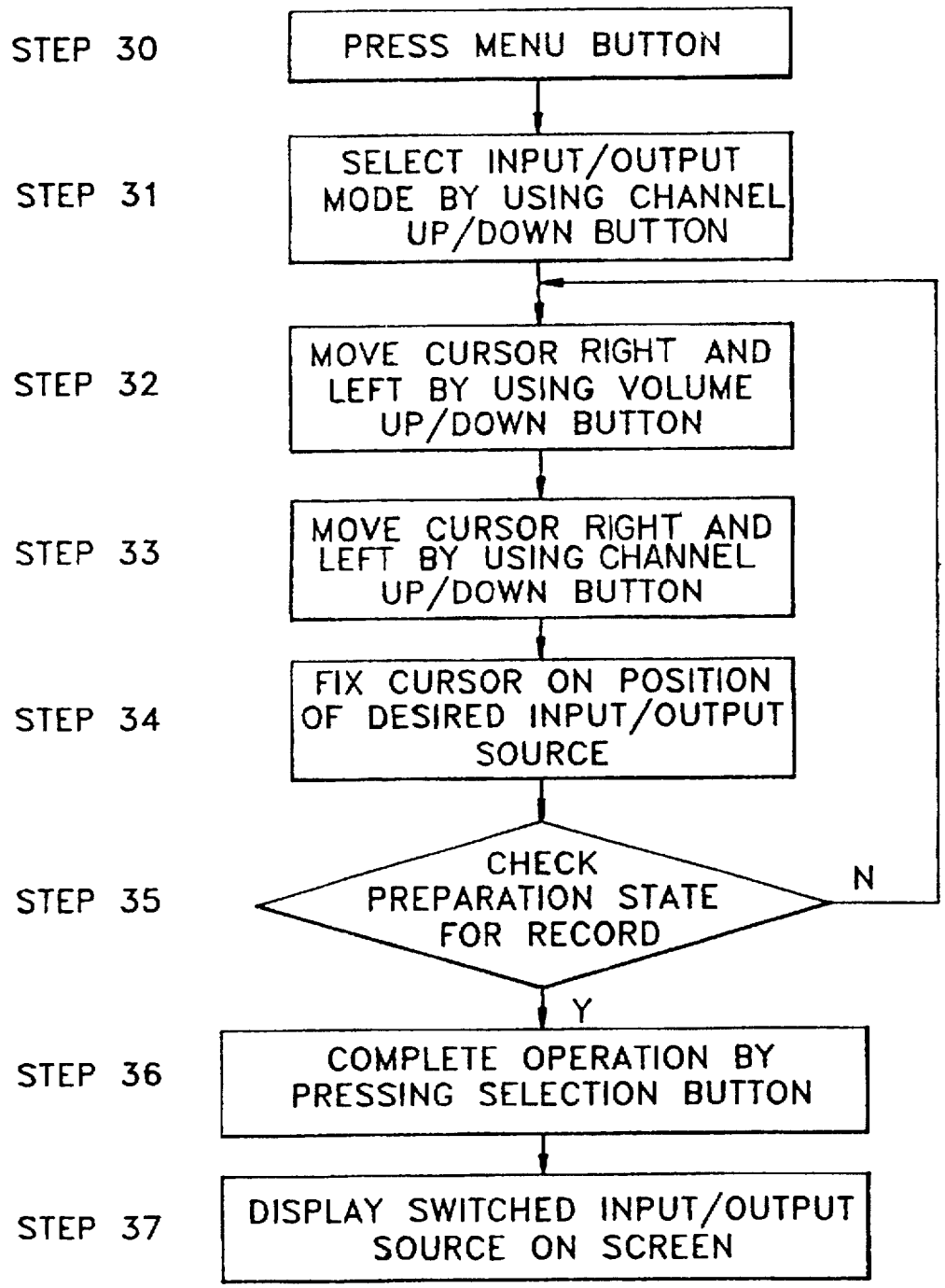

METHOD OF SELECTING INPUT/OUTPUT SOURCE IN DOUBLE/WIDE TELEVISION SET AND APPARATUS THEREFOR

BACKGROUND OF THE INVENTION

The present invention relates to a double/wide television set, and more particularly to a method and apparatus for selecting an input/output source in a double wide television set. The method and apparatus according to the present invention can be embodied with a double/wide television set incorporated with a double-deck video cassette recorder (VCR), a compact disc (CD) system, or a VCR and a CD system.

A double/wide television set enables an image signal to be displayed on a wide screen having an aspect ratio of 16 to 9 or two image signals received from each different signal source to be concurrently displayed on the right and the left screens, which are obtained by halving the wide screen. Accordingly, the television set has a function that enables a television and an image signal reproduced from a different outside image reproducing apparatus to be concurrently watched.

The double/wide television set incorporated with a double-deck VCR or a CD system has various input/output sources, so that users have trouble exactly connecting the various input/output sources according to the electrical conditions or displaying on a screen all signals according to the various input/output sources.

SUMMARY OF THE INVENTION

Therefore, it is an object of the present invention to provide a method of selecting an input/output source in a double/wide television set of the type which is incorporated with a double-deck VCR or a CD system, and an apparatus for implementing the method.

To accomplish the above object of the present invention, there is provided a method of selecting an input/output source in a double/wide television set incorporated a double-deck VCR comprising the steps of: (a) displaying a matrix screen by selecting an input/output mode; (b) selecting a desired input/output source from the displayed matrix screen; and (c) automatically switching the input/output source after the step (b), displaying the switched input/output source on a screen, and performing the selected operation according to the input/output source selected in the step (b).

To accomplish another object of the present invention, there is provided an apparatus of selecting an input/output source in a double/wide television set incorporated with a double-deck VCR, comprising: a ROM having all programs for controlling the selection of the input/output source; a master On-Screen Display generator (OSD) for displaying menus for selecting the input/output source on a screen of the double/wide television set; and a master controller having a microprocessor for performing a control operation according to the programs recorded in the ROM and generating character signals onto the master OSD according to an order of an operating unit.

BRIEF DESCRIPTION OF THE DRAWINGS

The above objects and advantages of the present invention will become more apparent by describing in detail a preferred embodiment thereof with reference to the attached drawings in which:

FIG. 3 is a flowchart illustrating another method for performing the present invention.

DETAILED DESCRIPTION OF THE INVENTION

Figure 1:
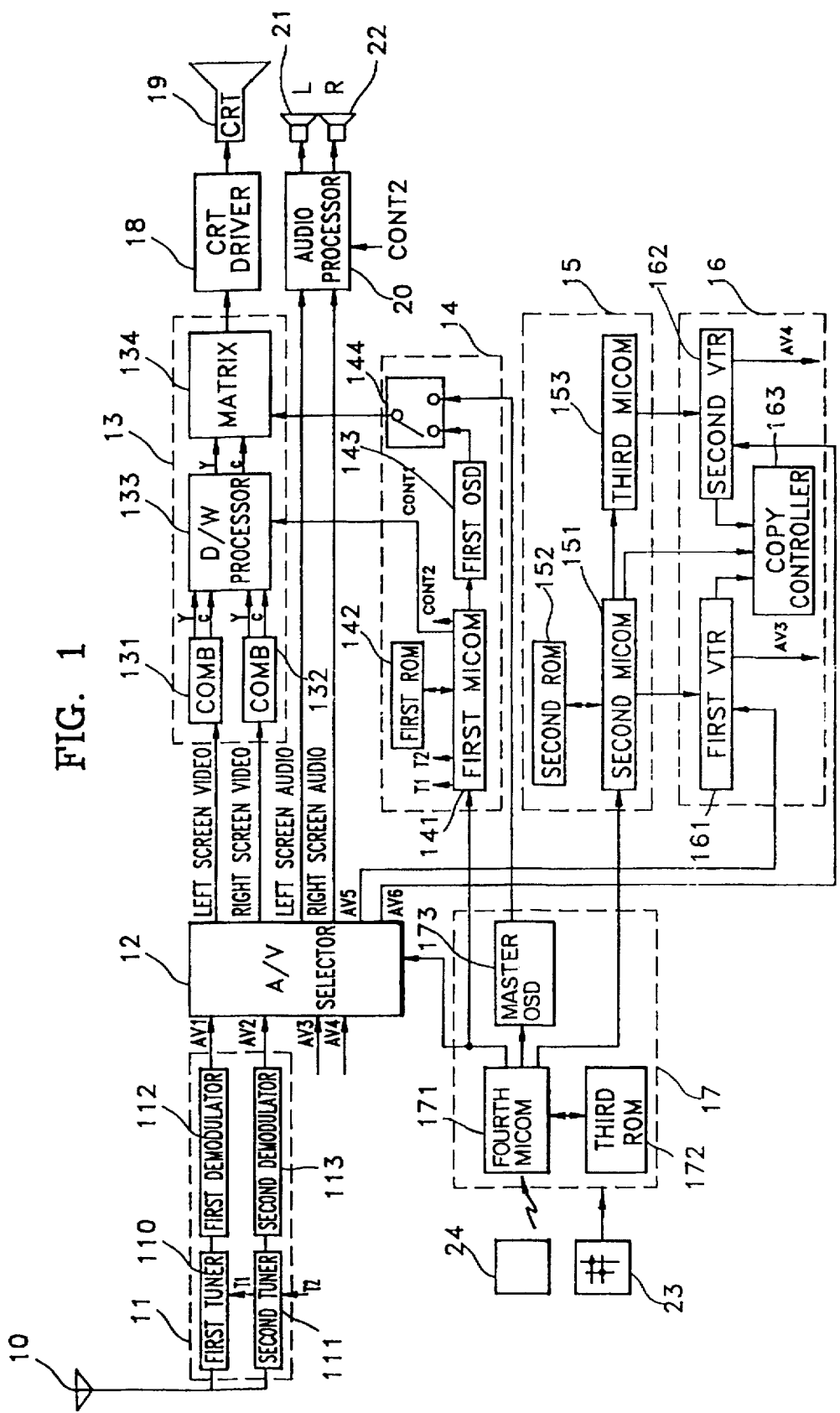
FIG. 1 is a block diagram showing the structure of a double/wide television set incorporated with a double-deck VCR.

Table 1 shows examples of double-deck VCRs which can be incorporated into the double/wide television set.

TABLE 1

| EXAMPLE | FIRST VCR | SECOND VCR |
|---------|-----------|------------|
| 1 | 8MM | VHS |
| 2 | VHS | VHS |
| 3 | 8MM | 8MM |

Alternatively, the double/wide television set can be incorporated with a CD system (for example, CD, CD-OK, CDG, or VCD), or with a CD system and a VCR. However, there is no difference in methods of controlling the operations of the systems. Thus, only the double/wide television set incorporated with a double-deck VCR will be described.

In table 2 an initial matrix display screen for selecting an input/output source and the corresponding numbers to each input/output source are shown.

TABLE 2

| | | OUTPUT | | |
|---|---|---|---|---|
| INPUT | 1 LEFT SCREEN | 2 RIGHT SCREEN | 3 8MM OR CD-OK | 4 VHS |
| 1 TV1 | 11 | 12 | 13 | 14 |
| 2 TV2 | 21 | 22 | 23 | 24 |
| 3 VIDEO INPUT 1 | 31 | 32 | 33 | 34 |
| 4 VIDEO INPUT 2 | 41 | 42 | 43 | 44 |
| 5 VIDEO INPUT 3 | 51 | 52 | 53 | 54 |
| 6 S-VIDEO INPUT | 61 | 62 | 63 | 64 |
| 7 8MM OR CD-OK | 71 | 72 | X | 74 |
| 8 VHS | 81 | 82 | 83 | X |

Here, when a user wants to display a signal connected with video input 1 on the right screen of the double/wide television set, he in turn selects an input terminal 3 of a transmitter and an output terminal 2 thereof. Accordingly, the corresponding number 32 is changed into a red solid line. Then, if a selection button is pressed, the selection is finished and the selected operation is performed.

As to recording a signal connected with a video input 2 on an 8 MM VCR, an input terminal 4 of the transmitter and an output terminal 3 thereof are in turn pressed. Accordingly, the corresponding number 43 is changed into a red solid line. Then, if the selection button is pressed, the selection is finished and the selected operation is performed. Further, when recording a screen of the 8 MM VCR on a VHS VCR, an input terminal 7 of the transmitter and an output terminal 4 thereof are in turn pressed. Accordingly, the corresponding number 74 is changed into a red solid line. Then, if the selection button is pressed, the selection is finished.

The symbol "X" in Table 2 shows that recording from an 8 MM VCR onto another 8 MM VCR is not performed, nor is recording from a VHS VCR onto another VHS VCR performed.

Here, the output of an image signal to the left and the right screens means that the image signal is to another apparatus during reproduction of the double/wide television set. Further, the output of the signal to the 8 MM VCR and the VHS VCR means that the signal from the selected input source is output to another apparatus during recording from the selected input source.

The matrix structure is achieved by software control of a microcomputer to a simple switching circuit, and a switching mode thereof.

The menus can be selected by a cursor displayed on a matrix screen. That is, conditions for a desired input/output on the matrix screen can be selected using the cursor according to a volume up/down key and a channel up/down key.

FIG. 1 is a block diagram showing a structure of a double/wide television set incorporated with a double-deck VCR according to the present invention, wherein the double-deck VCR having a first deck and a second deck is incorporated into the double/wide television set having a first screen and a second screen.

Here, the double-deck VCR incorporated into the double/wide television set is installed with a VHS VCR for the first deck and an 8 MM VCR for the second deck.

The apparatus shown in FIG. 1 has an antenna 10, a television signal receiver 11, an audio/video signal selector 12, a video signal processor 13, a television set controller 14, a double-deck VCR controller 15, a double-deck VCR 16, a master controller 17, a cathode ray tube (CRT) driver 18, a CRT 19, an audio signal processor 20, right and left speakers 22 and 21, and operating units 23 and 24.

Television signal receiver 11 has first and second tuners 110 and 111 for receiving a broadcast signal which is received by antenna 11 and modulated by a carrier and generating a video signal in which an intermediate frequency thereof is processed. Receiver 11 also has first and second demodulators 112 and 113 for receiving the video signal from first and second tuners 110 and 111 and generating first and second audio/video signals.

The audio/video signals output from television signal receiver 11 (AV1 and AV2) and double-deck VCR 16 (AV3 and AV4) are input into audio/video signal selector 12.

Audio/video signal selector 12 has a video signal selector and an audio signal selector, and selectively combines a plurality of audio/video signals received through input terminals thereof then outputs not only right and left screen video and audio signals but also fifth and sixth audio/video signals (AV5 and AV6) to first and second VCRs, respectively. That is, the video signal selector outputs right and left screen video signals and fifth and sixth video signals by selectively combining first through fourth received video signals, and the audio signal selector outputs right and left screen audio signals and fifth and sixth audio signals by selectively combining first through fourth received audio signals.

Furthermore, to expand the use of the apparatus, it is permitted that either audio/video signals are input from the outside or audio/video signals which are generated inside are output to the outside.

Video signal processor 13 has first and second comb filters 131 and 132 for receiving the right and the left screen video signals from audio/video selector 12, separating the received signals into luminance signals and chrominance signals and outputting the signals, a double/wide processor 133 for receiving the first and the second luminance signals and chrominance signals output from the first and second comb filters and double/wide-processing the received signals to output third luminance signals and chrominance signals, and a matrix portion 134 for receiving the third luminance and chrominance signals output from double/wide processor 133 and matrix-processing the received signals to generate RGB signals.

Furthermore, video signal processor 13 double/wide-processes the right and the left screen video signals supplied from audio/video signal selector 12 and outputs the processed results.

So as to concurrently display two video signals on first and second screens, it is necessary to synchronize the horizontal and the vertical scanning periods between video signals before combination and after combination. Here, horizontal and vertical scanning periods of the two video signals to be combined are assumed to be the same, respectively.

Scanning periods of the combined video signals are controlled by using a memory. For this purpose, the video signals are separated into luminance signals and chrominance signals, then digital-converted and recorded in the memory. Here, the scanning periods of the output video signals can be determined according to the control of the reading speed of the memory.

Double/wide processor 133 has first and second analog/digital converters, first and second frame memories, first and second record address generators, a read address generator, first and second digital/analog converters, a right and left screen switching portion, and a deflecting portion.

In operation, the first and the second record address generators generate a record address having the same recording speed as the scanning speed of the right and the left screen video signals. The video signals digital-converted by the analog/digital converter are recorded in the frame memory. Here, the recording speed on the frame memory is the same as the scanning speed of the right and the left screen video signals.

The read address generator generates a read address having a reading speed as two times the scanning speed of the left screen video signal. Accordingly, the reading speed of the frame memory is two times that of each scanning speed of the right and the left screen video signals.

Then, the horizontal scanning period of the video signals is divided into a first half and a second half. In the first half, the video signal recorded in the first frame memory is read, and in the second half, the video signal recorded in the second frame memory is read so that each video signal is read two times as fast as the recorded speed. As a result, the two video signals are combined into one video signal and then output.

Accordingly, each video signal is separately recorded on the frame memories, while the recording speed is the same as the scanning speed of each video signal. After the video signals are recorded on two frame memories, respectively, the reading speed is two times as fast as the recording speed.

Therefore, the recording speed of each video signal is the same as the speed of sequentially reading the two video signals, so that the two video signals are combined into one video signal.

The right and left screen switching portion reverses the right and the left screens by changing switching order of the signals read from the first and the second frame memories. Matrix portion 134 changes the luminance and the chrominance signals (Y,C) into RGB signals and then outputs the changed RGB signals into CRT driver 18.

Television set controller 14 has a first microprocessor 141, a first read only memory (ROM) 142, a first OSD 143, and an OSD selector 144.

In operation, television set controller 14 controls first and second tuners 110 and 111 and video signal processor 13 according to an order received by an operating unit such as a key inputting means 23 or a remote control 24 and controls selection operation of the tuners by generating control signals T1 and T2 of the first and the second tuners, respectively. According to the different broadcast channels selected by the two tuners, two programs can be concurrently watched.

Television set controller 14 generates double/wide control signals and right and left screen reversing signals to control a video signal processor 13.

Meanwhile, programs for controlling the television set are recorded in first ROM 142 of television set controller 14. First microprocessor 141 performs the control operation according to the programs recorded in first ROM 142, and generates character signals for performing operation of the operating unit through first OSD 143.

OSD selector 144 selects one of an OSD signal which is generated from first OSD 143 and a master OSD signal which is generated by master controller 17, thereby supplying the selected signal to matrix portion 134. Matrix portion 134 displays a signal obtained by superimposing the input OSD signal on the RGB signals on CRT 19 through CRT driver 18.

Double-deck VCR controller 15 has a second microprocessor 151, a second ROM 152, and a third microprocessor 153. Second microprocessor 151 is for the first VCR 161, third 153 for second 162. Here, third microprocessor 153 operates depending on second microprocessor 151. That is, while second microprocessor 151 is directly controlled by master controller 17, but third microprocessor 153 can be operated by second microprocessor 151 or by the order of master controller 17 which is transmitted through second microprocessor 151.

Taking it into account that the 8 MM second VCR 162 is not used as widely as the VHS first VCR 161, this enables burdens of a master controller 17 to be reduced according to the indirect control by second microprocessor 151 instead of the direct control by master controller 17 on third microprocessor 153.

Double-deck VCR 16 has first and second VCRs 161 and 162, respectively, and a copy controller 163.

Double-deck VCR 16 supplies the audio/video signals AV3 and AV4 reproduced in two VCRs 161 and 162 for audio/video signal selector 12, and then records the fifth and sixth audio/video signals from audio/video signal selector 12 on first and second VCRs 161 and 162, respectively, or records the audio/video signals reproduced in the first VCR on the second VCR.

Here, first VCR 161 is of the VHS system, and second 162 the 8 MM system. Accordingly, this not only enables video tapes for an 8 MM VCR, which is widely used in a movie camera, to be accepted, but also the data between the VCRs of the 8 MM and the VHS systems to be simply changed with each other.

Master controller 17 has a fourth microprocessor 171, a third ROM 172, and a master OSD 173.

Master controller 17 controls television set controller 14, double-deck VCR controller 15, audio/video signal selector 12, and master OSD 173 according to the orders received by the operating unit such as key inputting portion 23, or remote control 24.

In third ROM 172 programs for various controls are recorded. Fourth microprocessor 171 performs a control operation according to the program recorded on third ROM 172, and generates character signals for operating unit through master OSD 173.

Master controller 17 generates audio/video selection signals to control audio/video signal selector 12 and generates signals for operating video signal processor 13, audio signal processor 20, and double-deck VCR controller 15.

Master controller 17 controls master OSD 173 so that the input/output source of the matrix form is displayed on the master OSD. From the displayed matrix screen, a desired input/output source is selected by the operating unit.

CRT driver 18 enables RGB signals output from video signal processor 13 to be displayed as an image signal on CRT 19.

In audio signal processor 20, the right and the left screen audio signals supplied by audio/video signal selector 12 are surround-processed and output to right and left speakers 21 and 22 according to the operation of selecting and processing a speaker/headphone. Here, it is possible to selectively control such that the audio signals corresponding to the right and the left screen video signals are output from the right and the left speakers, or the audio signal corresponding to the left screen video signal is output from the right and the left speakers and the audio signal corresponding to the right screen video signal is output to a headphone output terminal.

Figure 2:
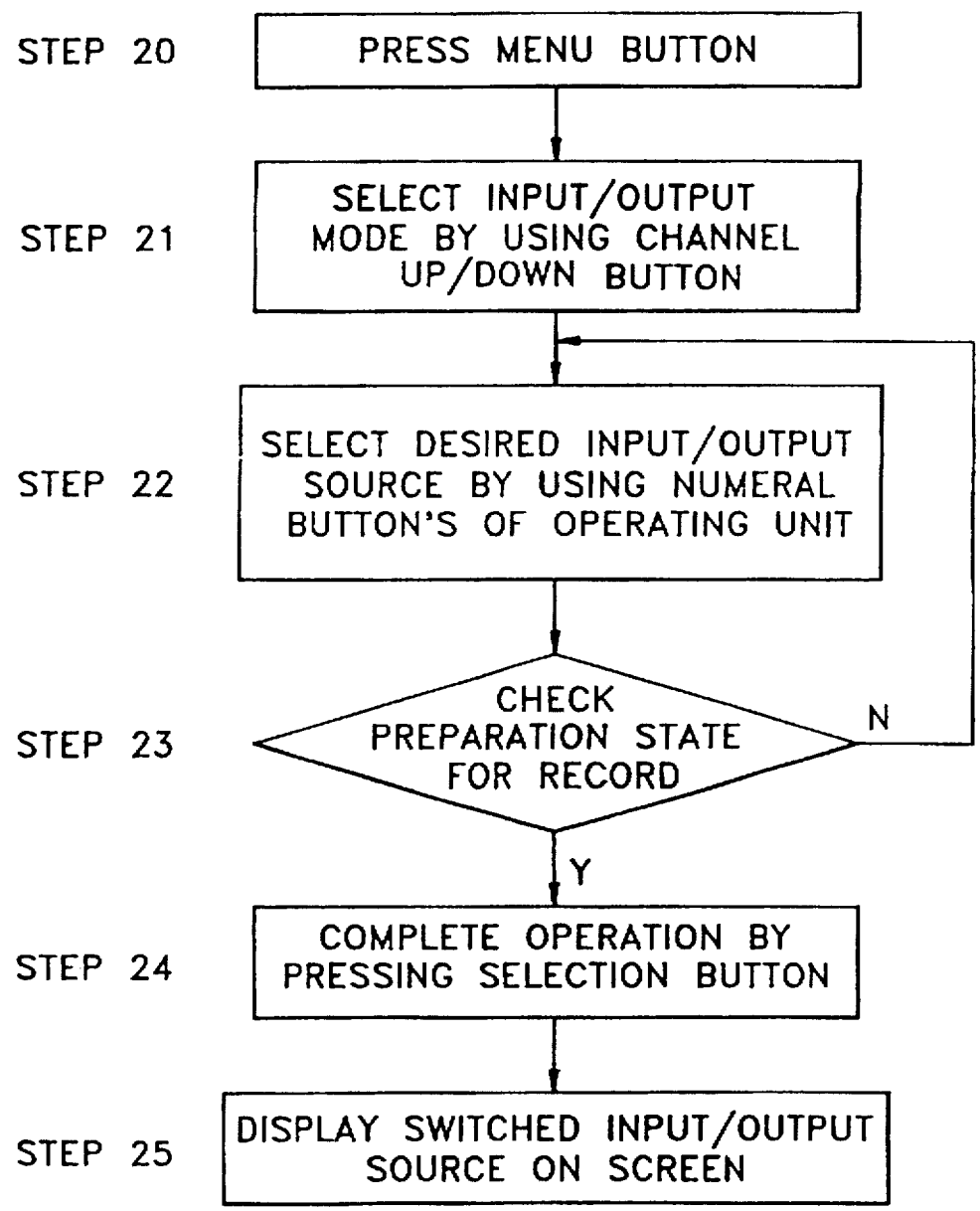
FIG. 2 is a flowchart illustrating a method for performing the present invention.

FIG. 2 is a flowchart illustrating a method for performing the present invention. Referring to FIG. 2, the process of selecting the input/output source according to the numeral buttons of the operating unit will be described.

First, a menu button is pressed (step 20), and then a matrix screen is displayed by selecting an input/output mode using a channel up/down button (step 21).

A desired input/output source is selected from the displayed matrix screen after step 21, by numeral buttons of the operating unit (step 22). Here, the selected number is changed into a red solid line, so that the selected number can be distinguished.

Next, a connection state of the plug jacks of the input/output source, that is, a preparation state for record is checked (step 23). In case that the preparation state is not satisfied, the input/output source is once again selected after feedback to step 22.

When the preparation state is satisfied, the selection button is pressed, and accordingly, the selection operation is completed (step 24).

After step 24 is performed, the input/output source of the double-deck double/wide set is automatically switched, and then displayed on the screen (step 25).

FIG. 3 is a flowchart for illustrating another method of performing the present invention. Referring to FIG. 3, a process of selecting the input/output source by moving the cursor using the volume up/down button or the channel up/down button will be described.

First, a menu button is pressed (step 30), and then a matrix screen is displayed by selecting an input/output mode using the channel up/down button (step 31). Then, a desired output source is selected from the displayed matrix screen by moving the cursor right or left using the volume up/down button (step 32).

Next, a desired input source is selected by moving the cursor up or down using the channel up/down button (step 33).

The cursor is fixed on a position of the desired input/output source, by operations of the steps 32 and 33 (step 34). Here, the selected number is changed into a red solid line, so that the selected number can be distinguished.

Next, a connection state of the plug jacks of the input/output source, that is, a preparation state for recording, is checked (step 35). In case that the preparation state is not satisfied, the input/output source is once again selected after feedback to step 32.

When the preparation state is satisfied, a selection button is pressed, and accordingly, a selection operation is completed (step 36).

After step 36 is performed, the input/output source of the double-deck double/wide television set is automatically switched, and then displayed on the screen (step 37).

As described above, according to the double/wide television set of the present invention, a matrix screen is inserted into a basic screen of the master OSD 173 in a master controller 17, and then the input/output source is selected from the matrix screen only by numeral buttons of a separate key such as a remote control 24. Alternatively, a cursor is displayed on the matrix screen, and then the input/output source is selected by movement of the cursor, which accordingly simplifies the process of selecting the input/output source.

What is claimed is:

1. A method of selecting an input/output source in a double/wide television set incorporated with a double-deck VCR or a CD system, the method comprising the steps of:

(a) displaying a matrix screen by selecting an input/output mode;

(b) selecting a desired input/output source from said displayed matrix screen; and (c) automatically switching said input/output source after said step (b), and displaying said switched input/output source on a screen.

2. A method of selecting an input/output source in a double/wide television set incorporated with a double-deck VCR or a CD system, the method comprising the steps of:

(a) displaying a matrix screen by selecting an input/output mode;

(b) selecting a desired input/output source from said displayed matrix screen; and (c) automatically switching said input/output source after said step (b), and displaying said switched input/output source on a screen;

wherein said step (b) is performed by moving a cursor using a volume up/down button and a channel up/down button.

3. The method of selecting an input/output source according to claim 1, wherein said step (b) is performed by using one or more numeral buttons of an operating unit.

4. A method of selecting an input/output source in a double/wide television set incorporated with a double-deck VCR or a CD system, the method comprising the steps of:

(a) displaying a matrix screen by selecting an input/output mode;

(b) selecting a desired input/output source from said displayed matrix screen, (c) automatically switching said input/output source after said step (b), and displaying said switched input/output source on a screen; and (d) displaying the number of the input/output source selected from said displayed matrix screen with a particular color to be distinguished.

5. The method of selecting an input/output source according to claim 1, further comprising the steps of:

checking a preparation state for recording; and feeding back to an initial matrix screen when the preparation state is not satisfied.

6. An apparatus for selecting an input/output source in a double/wide television set incorporated with a double-deck VCR or a CD system, comprising:

a ROM having programs for controlling the selection of the input/output source;

a master on-screen display generator for displaying on-screen matrix menus for selecting a particular input/output source on a screen of said double/wide television set; and a master controller means for performing a control operation according to said programs recorded in said ROM and generating character signals to said master on-screen display generator in response to signals received from an operating unit.

7. The apparatus for selecting an input/output source according to claim 6, wherein said master controller means has a microprocessor for implementing said programs recorded in said ROM.

8. The apparatus for selecting an input/output source according to claim 6, wherein said control operation of said master controller means includes controlling selection of input audio and video signals by an audio/video selector of said double/wide television set in response to signals received from an operating unit.

9. The apparatus for selecting an input/output source according to claim 6, wherein said operating unit is selected from the group consisting of: a key inputting portion and a remote control.

10. The apparatus for selecting an input/output source according to claim 8, wherein said operating unit is selected from the group consisting of: a key inputting portion and a remote control.

11. The apparatus for selecting an input/output source according to claim 8, wherein said control operation of said master controller means includes checking a preparation state for recording of plug jacks corresponding to a particular audio/video signal which has been selected in response to signals received from an operating unit.

12. The apparatus for selecting an input/output source according to claim 6, wherein said master controller means responds to signals from a volume up/down button and a channel up/down button to move a cursor displayed by said master on-screen display generator.

13. The apparatus for selecting an input/output source according to claim 6, wherein said master controller means commands said master on-screen display generator to display the number of the input/output source selected from said on-screen matrix menus.

* * * * *